United States Patent
Watanabe et al.

(10) Patent No.: US 10,013,188 B2
(45) Date of Patent: Jul. 3, 2018

(54) STORAGE CONTROL DEVICE AND METHOD OF COPYING DATA IN FAILOVER IN STORAGE CLUSTER

(71) Applicant: FUJITSU LIMITED, Kawasaki-shi, Kanagawa (JP)

(72) Inventors: Tetsuo Watanabe, Nagoya (JP); Hajime Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 14/927,521

(22) Filed: Oct. 30, 2015

(65) Prior Publication Data

US 2016/0179418 A1 Jun. 23, 2016

(30) Foreign Application Priority Data

Dec. 17, 2014 (JP) ................. 2014-255533

(51) Int. Cl.
| | | |
|---|---|---|
| *G06F 12/00* | (2006.01) | |
| *G06F 3/06* | (2006.01) | |
| *G06F 11/07* | (2006.01) | |
| *G06F 13/00* | (2006.01) | |
| *G06F 13/28* | (2006.01) | |

(52) U.S. Cl.
CPC ............ *G06F 3/0619* (2013.01); *G06F 3/065* (2013.01); *G06F 3/067* (2013.01); *G06F 3/0617* (2013.01); *G06F 3/0635* (2013.01); *G06F 3/0673* (2013.01); *G06F 11/07* (2013.01)

(58) Field of Classification Search
CPC ........ G06F 3/0619; G06F 3/065; G06F 3/0673
See application file for complete search history.

(56) References Cited

U.S. PATENT DOCUMENTS

| | | | |
|---|---|---|---|
| 6,950,915 B2 | 9/2005 | Ohno et al. | |
| 7,290,103 B2 * | 10/2007 | Umemura | ............ G06F 3/0605 711/114 |
| 7,457,830 B1 * | 11/2008 | Coulter | ............... G06F 11/1471 |
| 9,098,466 B2 * | 8/2015 | Barnes | ................... G06F 11/20 |
| 2005/0114595 A1 | 5/2005 | Karr et al. | |
| 2008/0162590 A1 * | 7/2008 | Kundu | ................ G06F 11/1471 |
| 2015/0278049 A1 * | 10/2015 | Saito | .................... G06F 3/0617 714/6.3 |

FOREIGN PATENT DOCUMENTS

| | | |
|---|---|---|
| JP | 2004-013367 | 1/2004 |
| JP | 2007-516523 | 6/2007 |
| WO | 2005055043 | 6/2005 |

* cited by examiner

*Primary Examiner* — Mark A Giardino, Jr.
(74) *Attorney, Agent, or Firm* — Fujitsu Patent Center

(57) ABSTRACT

A determining unit determines, when a failover occurs, whether the storage device is a master device. If the determining unit determines that the storage device is not the master device, a converting unit converts the virtual LUNs of the copy source and the copy destination to the real LUNs. Then, a copying unit performs a copy process by using the real LUNs converted by the converting unit.

8 Claims, 12 Drawing Sheets

FIG.10

| COPY SOURCE INFORMATION || COPY DESTINATION INFORMATION ||
|---|---|---|---|
| BoxID | LUN | BoxID | LUN |
| A | 0x3 | A | 0x5 |
|  |  |  |  |

FIG.11

| BoxID | LUN | BoxID | LUN |
|---|---|---|---|
| A | 0x3 | B | 0x4 |
| A | 0x5 | B | 0x2 |

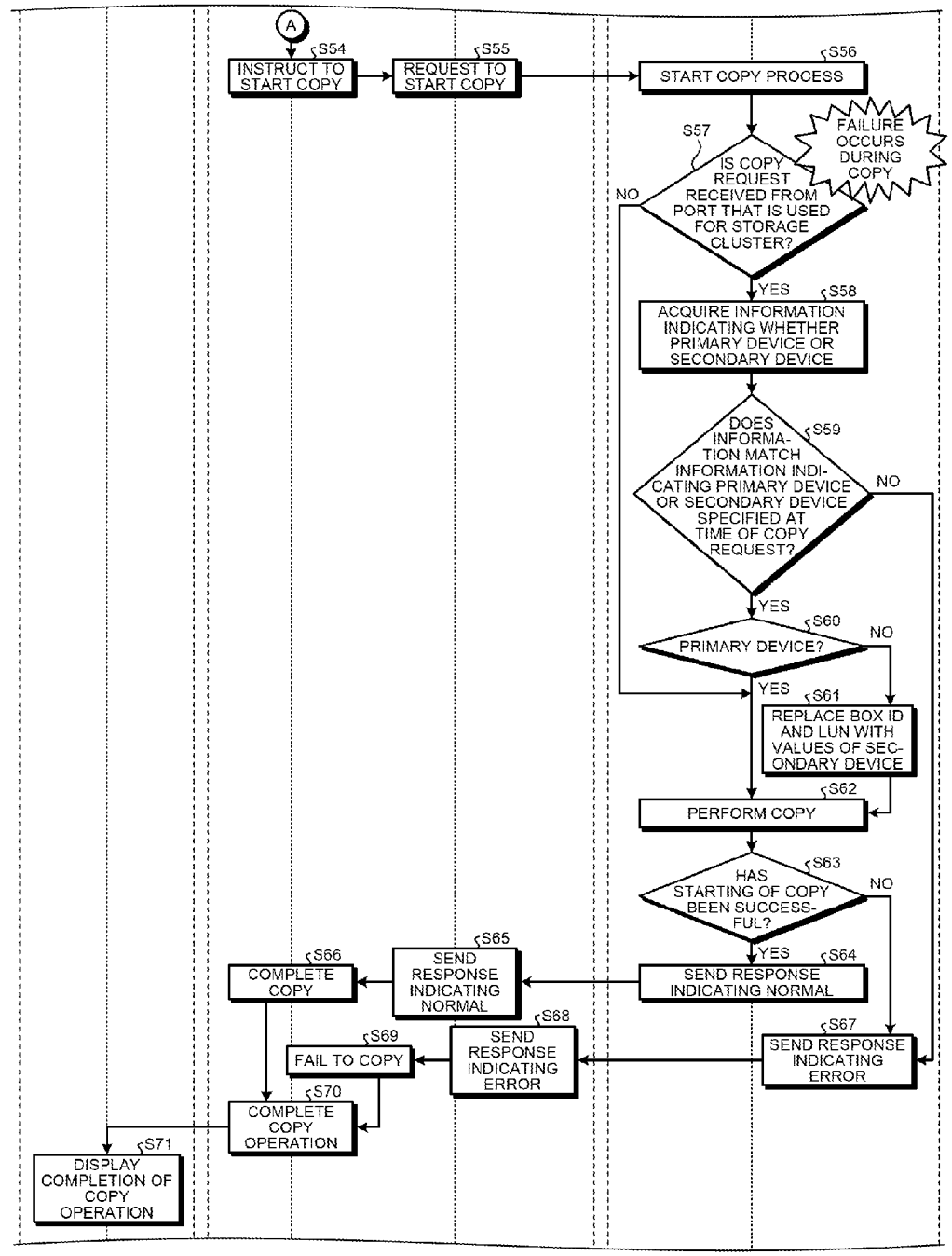

STORAGE CONTROL DEVICE AND METHOD OF COPYING DATA IN FAILOVER IN STORAGE CLUSTER

CROSS-REFERENCE TO RELATED APPLICATION

This application is based upon and claims the benefit of priority of the prior Japanese Patent Application No. 2014-255533, filed on Dec. 17, 2014, the entire contents of which are incorporated herein by reference.

FIELD

The embodiment discussed herein is related to a storage control device and computer-readable recording medium.

BACKGROUND

There is a storage cluster as one of technologies that improve reliability of storage devices. The storage cluster has a cluster structure constituted by a plurality of storage devices and is a technology that implements a failover in which, even if one of the storage devices is down due to a failure at a device level, business can be continued by another storage device.

The storage cluster can be set in units of volumes and automatically takes over Write/Read I/O of a storage device in which a failure has occurred to another storage device. Accordingly, this makes it possible for a user to continue the business without being aware of the occurrence of an abnormality and thus it is possible to reduce the recovery time and the workload imposed on a storage administrator.

A volume in the storage cluster can be implemented by allowing a host to indicate the volume as, for example, another path of the same volume. The "host" mentioned here is a device, such as a server or the like, that accesses the storage device, whereas the "path" mentioned here is a communication path between the host and the storage device. In the storage cluster, the path in operation is used as "active", the path on the waiting side is used as "standby", and only the active storage device can be accessed. If the storage device in operation is down, the storage cluster changes a path state, sets the path on the waiting side to active, and automatically takes over Write/Read I/O.

Furthermore, there is a conventional technology in which an off host Virtualizer creates meta data on an operating system of a first virtual storage device and can access a first host, thereby allowing a cross-platform access to the storage volumes.

Furthermore, there is a conventional technology in which, between data storage subsystems, by copying attribute information by using the same data transfer path as that used for a remote copy function of data, a host computer can use a data storage subsystem at the copy destination without handling details.

Patent Document 1: Japanese National Publication of International Patent Application No. 2007-516523
Patent Document 2: Japanese Laid-open Patent Publication No. 2004-13367

When an operation is performed with respect to a volume, a host converts a device name, of an operation target, that is commonly set for the storage devices to a logical unit number (LUN) and specifies the operation target by the LUN. The "LUN" mentioned here is an identification number for logically identifying a device for storage in the storage device.

Furthermore, in the plurality of storage devices constituting volumes in the storage cluster, the device names are made to match between the active and the standby storage devices; however, the LUNs do not need to be matched. The reason for this is that, in order to match LUNs of the active storage device and the standby storage device, the same configuration is needed in both the storage devices; therefore, the load imposed on an administrator is significantly increased. Accordingly, in the present state, LUNs are not made to match in most cases even if storage devices have association relationship of the active side and the standby side.

However, if a failover occurs when an operation of specifying a LUN of a volume in a storage cluster is performed, because the LUNs do not match between the volumes associated with the active side and the standby side, there is a problem in that a false volume is operated after the failover.

SUMMARY

According to an aspect of an embodiment, a storage control device controls storage devices constituting a storage cluster, the storage control device including a memory and a processor coupled to the memory, the processor executing a process including: determining, when a failover occurs during a copy process, whether a storage device controlled by the storage control device is a master device that performs the copy process by using two identifiers specified about a copy pair by a copy instruction; converting, when it is determined that the storage device is not the master device at the determining, the two identifiers that specify a copy pair and are specified by the copy instruction to two identifiers that specify a copy pair in the storage device controlled by the storage control device; and performing the copy process by using the two identifiers converted at the converting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a schematic diagram illustrating an example of a copy pair information table;

FIG. 11 is a schematic diagram illustrating an example of a LUN conversion table;

FIG. 12C is a third flowchart illustrating the flow of a process performed by the information processing system according to the embodiment;

DESCRIPTION OF EMBODIMENT

A Preferred embodiment of the present invention will be explained with reference to accompanying drawings. The disclosed technology is not limited to the embodiment.

First, cluster pairs and copy pairs will be described. The "cluster pair" mentioned here is volumes to be paired in a storage cluster. The "copy pair" mentioned here is a pair of volumes of the copy source and the copy destination and a pair of, for example, in a backup, a volume to be backed up and a backup volume.

Figure 1:
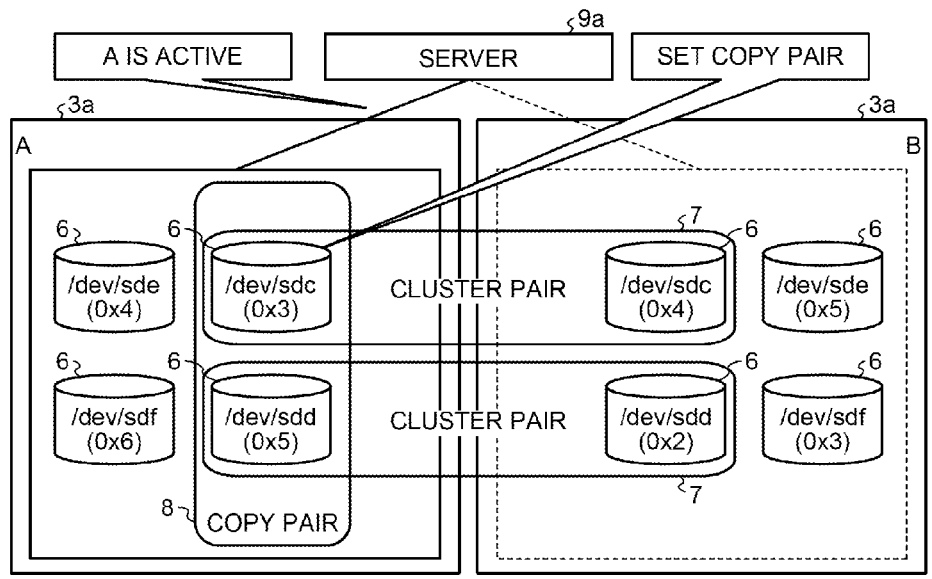
FIG. 1 is a schematic diagram illustrating cluster pairs and a copy pair.

FIG. 1 is a schematic diagram illustrating cluster pairs and a copy pair. In FIG. 1, the symbols A and B indicate storage devices 3a constituting a storage cluster. The storage device 3a represented by A is active, whereas B is standby. A server 9a is a computer that uses the storage cluster. The symbols of /dev/sdc, /dev/sdd, /dev/sde, and /dev/sdf indicate device names. The symbols of 0x2 to 0x6 indicate the LUNs. Here, "0x" represents a hexadecimal number.

As illustrated in FIG. 1, volumes 6 with the device name of /dev/sdc constitute a cluster pair 7 of the volume 6 with the LUN of 0x3 in A and the volume 6 with LUN of 0x4 in B. Furthermore, the volumes 6 with the device name of /dev/sdd constitute the cluster pair 7 of the volume 6 with the LUN of 0x5 in A and the volume 6 with the LUN of 0x2 in B. In this way, for the cluster pairs 7, the device names do match; however, the LUNs do not need to match. Furthermore, the volume 6 with the device name of /dev/sdc and the volume 6 with the device name of /dev/sdd are a copy pair 8.

Figure 2:
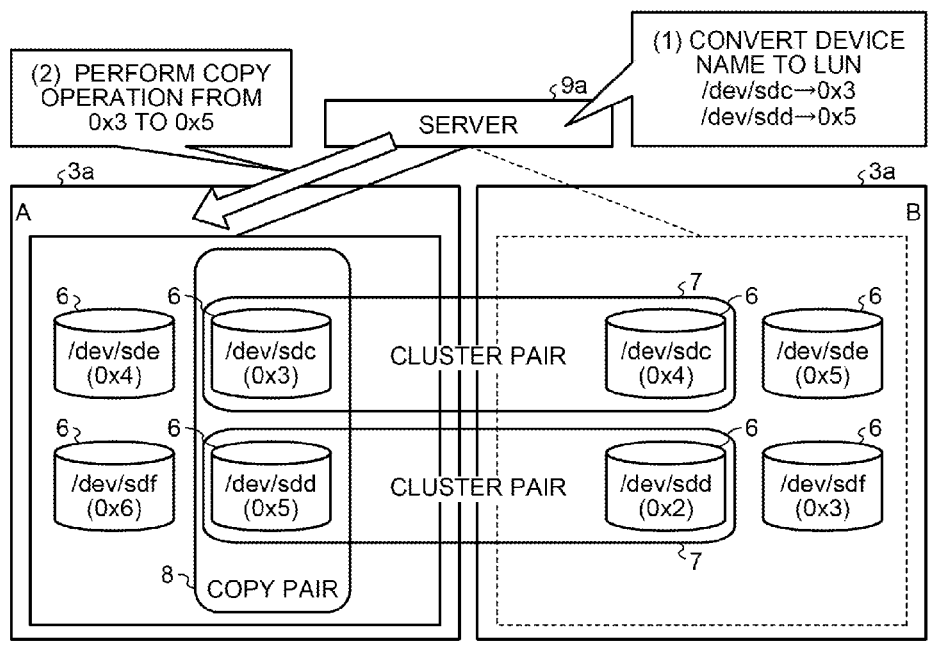
FIG. 2 is a schematic diagram illustrating a copy in the copy pair.

At this point, a storage administrator sends an instruction to copy the volume 6 with the device name of /dev/sdc to the volume 6 with the device name of /dev/sdd. Then, as illustrated in FIG. 2, the server 9a converts the device names to the LUNs (1) and instructs A to perform a copy operation after specifying the LUNs (2). Specifically, the server 9a converts /dev/sdc to 0x3 and converts /dev/sdd to 0x5. Then, the server 9a instructs A to copy from LUN (0x3) to LUN (0x5). Here, the LUN (0xn) represents the volume 6 with the LUN of 0xn.

Figure 3:
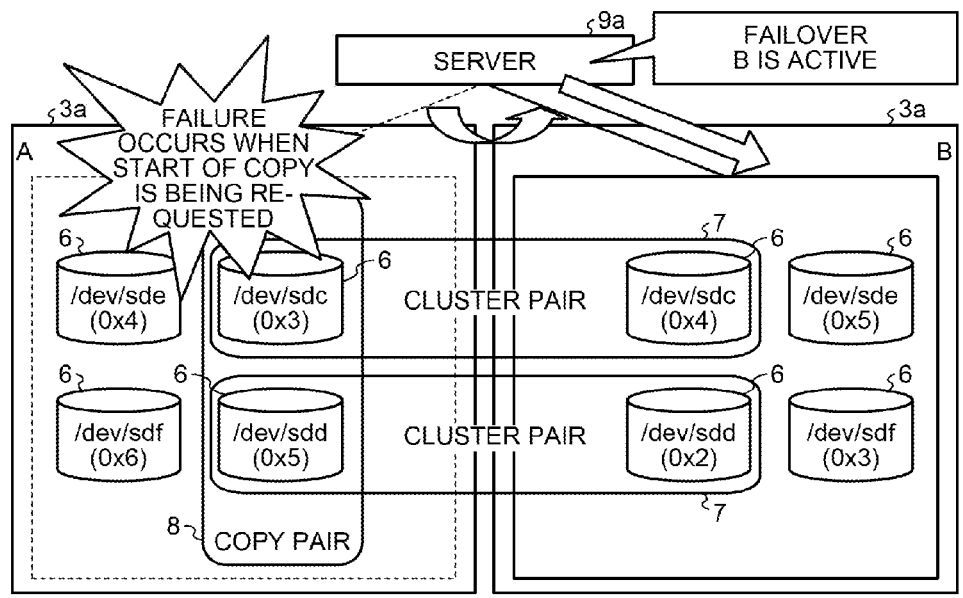
FIG. 3 is a schematic diagram illustrating a failover occurring when a start of a copy is being requested.

Then, as illustrated in FIG. 3, a failure occurs in A when a start of the copy is being requested and then the active storage device 3a is changed from A to B. Then, because the path state of the storage device 3a that is in operation is changed, a retry error of a small computer system interface (SCSI) command occurs and thus the SCSI command is automatically retried in B.

Figure 4:
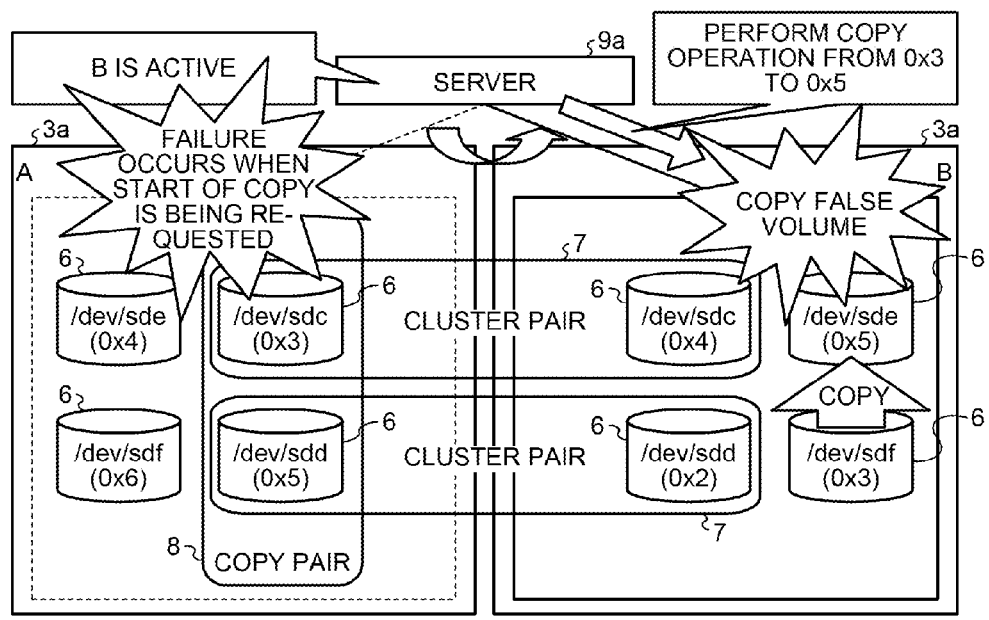
FIG. 4 is a schematic diagram illustrating a problem of a failover occurring when a start of a copy is being requested.

However, if a copy from the LUN (0x3) to the LUN (0x5) is performed in B, because the volumes 6 that are associated with the copy pair 8 in B are the LUN (0x4) and the LUN (0x2), as illustrated in FIG. 4, the false volumes 6 are operated.

As described above, when the server 9a instructs a volume operation, if a failover occurs before the volume operation has been completed, the false volumes 6 are operated in the storage device 3a that has newly become active, which is a problem. The similar problem also occurs in a case in which a failover occurs in a time period after the server 9a converts the device names of the operation target volumes 6 to the LUNs until the server 9a issues an instruction of the volume operation. Furthermore, the similar problem also occurs in a case in which a failover occurs in a time period after the server 9a issues an instruction of the volume operation until the storage device 3a performs the volume operation.

Thus, if the server according to the embodiment outputs a copy instruction to a storage device 3, the server outputs the copy instruction by using a virtual LUN. The "virtual LUN" mentioned here is a LUN of a master storage device 3 determined from among the plurality of the storage devices 3. Furthermore, hereinafter, the LUN in each of the storage devices 3 is referred to as a "real LUN". In the master device, the real LUN and the virtual LUN are the same.

Figure 5:
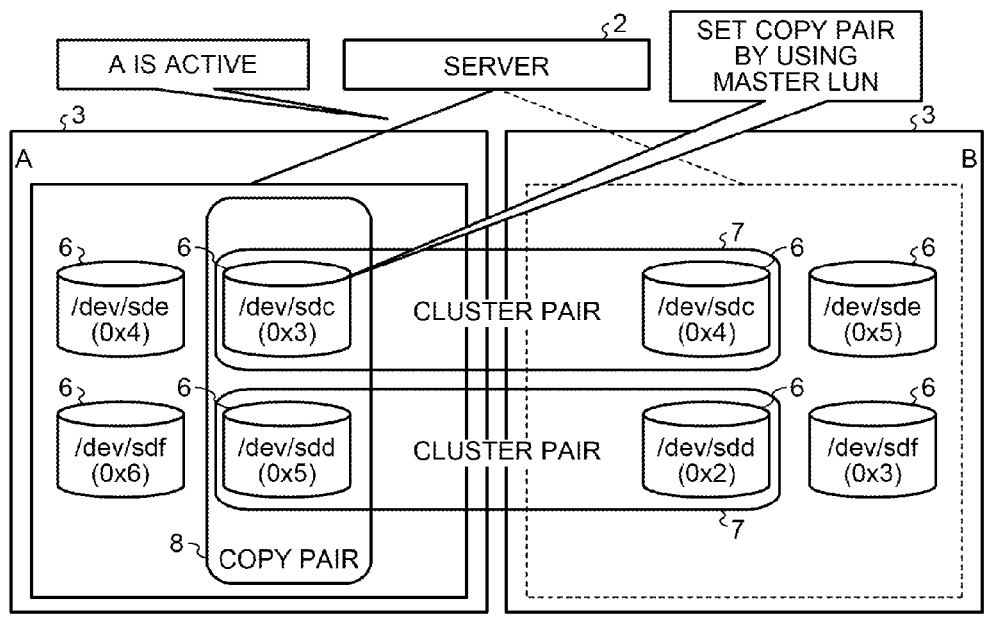
FIG. 5 is a schematic diagram illustrating virtual LUNs.

FIG. 5 is a schematic diagram illustrating virtual LUNs. FIG. 5 illustrates a case in which A is the master and, furthermore, A is active. Furthermore, (0xi, 0xj) represents (virtual LUN, real LUN).

As illustrated in FIG. 5, in A that is the master, (virtual LUN, real LUN) associated with /dev/sdc are (0x3, 0x3) and (virtual LUN, real LUN) associated with /dev/sdd are (0x5, 0x5). In contrast, in B that is not the master, (virtual LUN, real LUN) associated with /dev/sdc are (0x3, 0x4) and (virtual LUN, real LUN) associated with /dev/sdd are (0x5, 0x2). Namely, in B, the LUN associated with dev/sdc is 0x4 and the LUN associated with /dev/sdd is 0x2.

Figure 6:
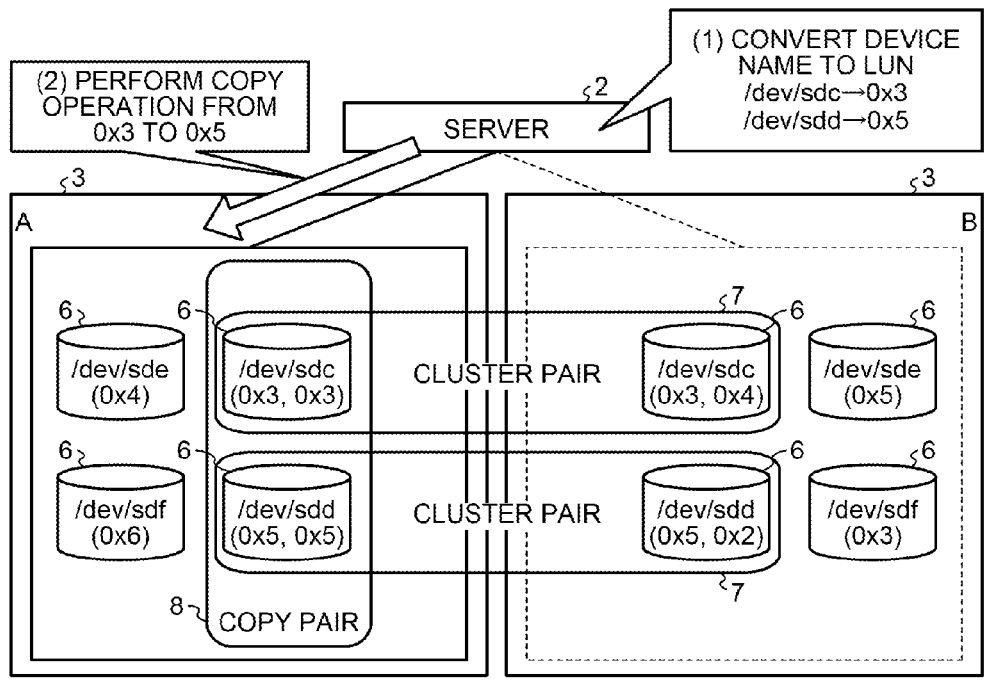
FIG. 6 is a schematic diagram illustrating a copy instruction performed by using the virtual LUNs.

When a server 2 outputs an instruction to copy from /dev/sdc to /dev/sdd, as illustrated in FIG. 6, the server 2 converts the device names to the virtual LUNs (1) and instructs A, which is active, to copy from the LUN (0x3) to the LUN (0x5) (2). Furthermore, if B is active, when the server 2 sends an instruction to copy from /dev/sdc to /dev/sdd, the server 2 also outputs an instruction to copy from the LUN (0x3) to the LUN (0x5) by using the virtual LUNs.

Figure 7:
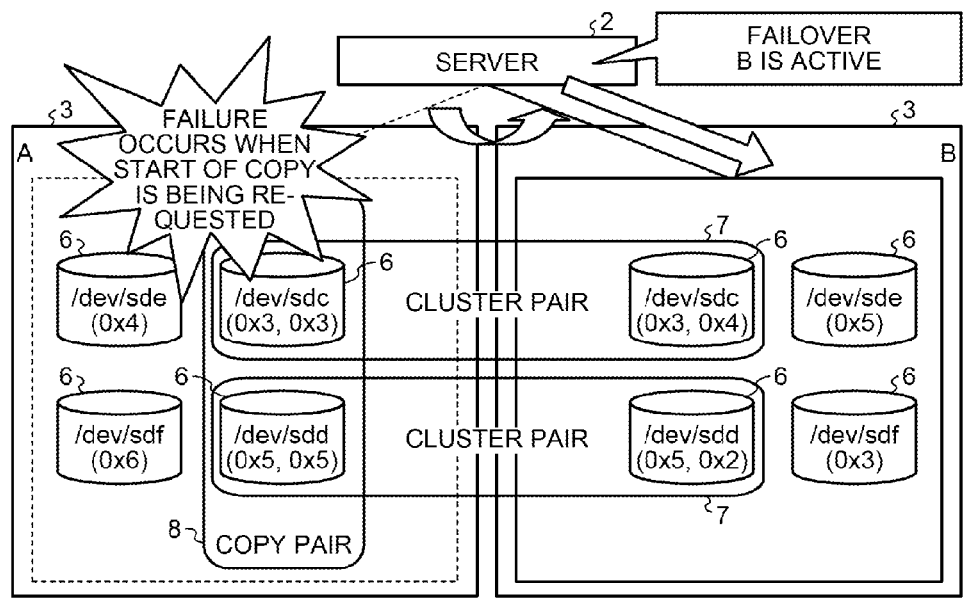
FIG. 7 is a schematic diagram illustrating a failover occurring when a start of a copy is being requested.
Figure 8:
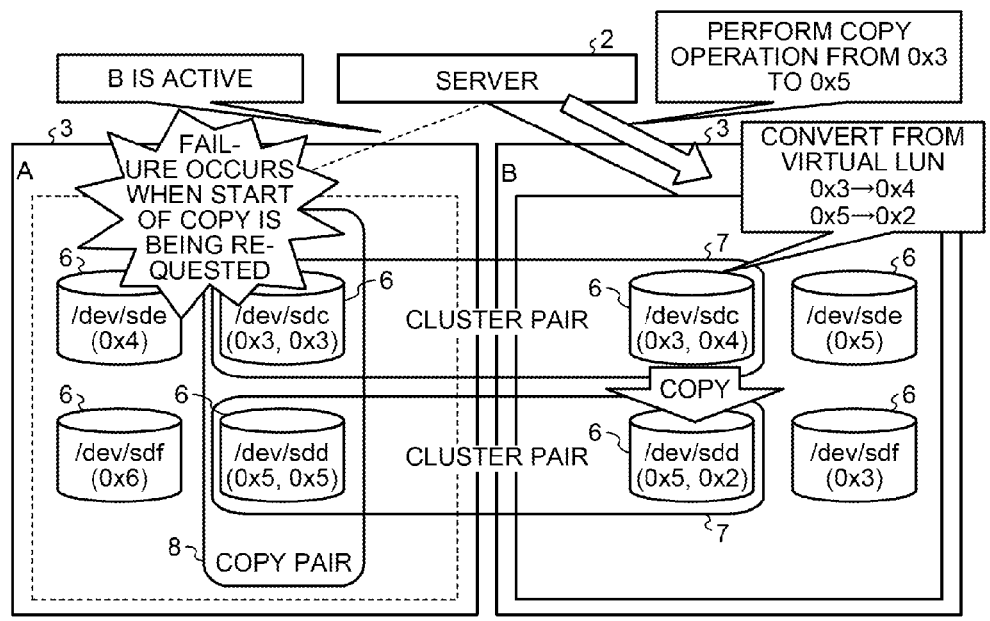
FIG. 8 is a schematic diagram illustrating conversion from virtual LUNs to real LUNs by a storage device.

Then, if a failure occurs in A when a start of the copy is being requested, as illustrated in FIG. 7, the active storage device 3 is changed from A to B. Then, as illustrated in FIG. 8, when B performs a copy from the LUN (0x3) to the LUN (0x5), B performs conversion from the virtual LUN to the real LUN. Namely, B converts 0x3 to 0x4 and converts 0x5 to 0x2. Then, B copies from the LUN (0x4) to the LUN (0x2).

As described above, the server 2 according to the embodiment outputs a copy instruction to the storage device 3 by using the virtual LUNs. Then, the master that received the copy instruction performs a copy process without changing the virtual LUNs. In contrast, when the storage device 3 other than the master receives the copy instruction, the storage device 3 converts the virtual LUNs to the real LUNs and performs the copy process. Accordingly, if a failover occurs and the storage device 3 other than the master has newly become active, the storage device 3 can prevent an operation performed on the false volume 6.

Figure 9:
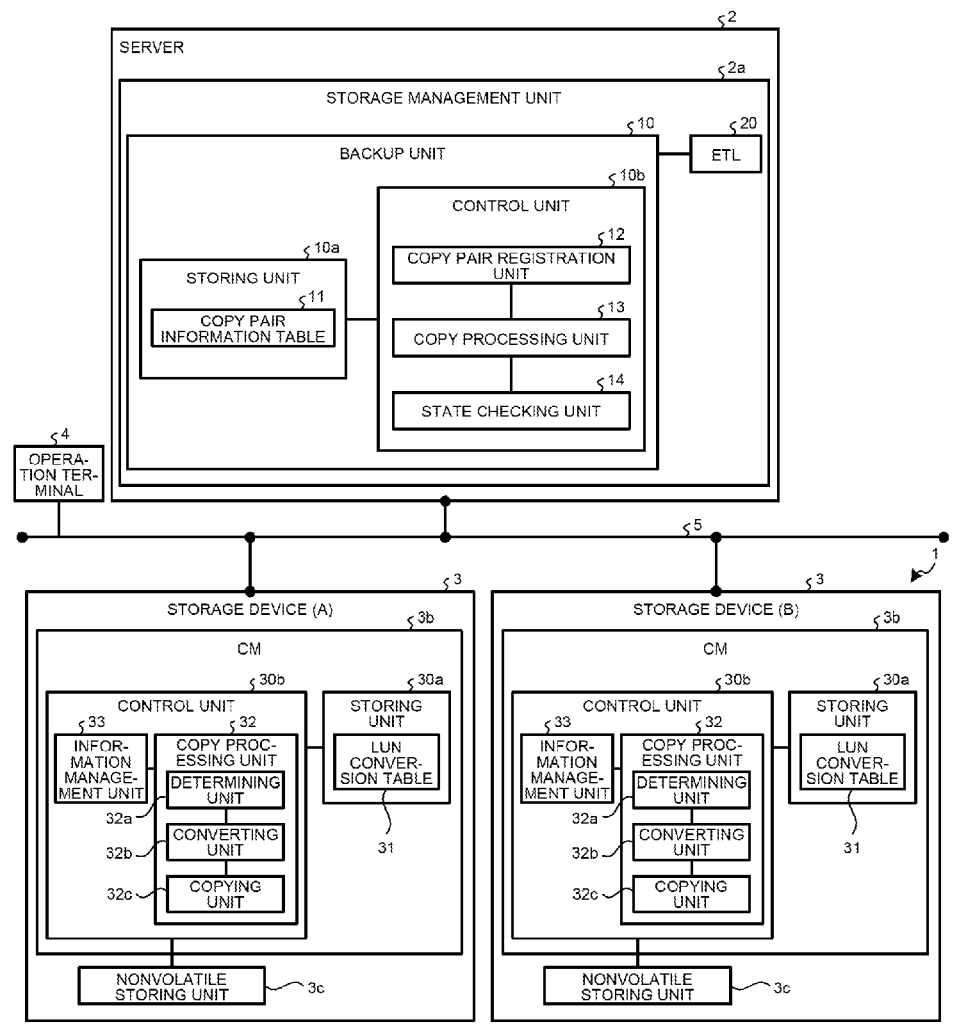
FIG. 9 is a schematic diagram illustrating the configuration of an information processing system according to an embodiment.

In the following, the configuration of an information processing system according to the embodiment will be described. FIG. 9 is a schematic diagram illustrating the configuration of the information processing system according to the embodiment. As illustrated in FIG. 9, the information processing system 1 according to the embodiment includes the server 2, two storage devices 3 constituting a storage cluster, and an operation terminal 4. The server 2, the storage devices 3, and the operation terminal 4 are connected by using a network 5. Furthermore, for convenience of explanation, only the single server 2 and the two storage devices 3 are illustrated; however, the information processing system 1 according to the embodiment may also include a plurality of the servers 2 and an arbitrary number of the storage devices 3 that constitute the storage cluster.

The server 2 is a computer that uses a storage cluster. The server 2 includes a storage management unit 2a as a functioning unit that manages the storage device 3. The storage management unit 2a includes a backup unit 10 and an Extraction, Transformation and Load (ETL) 20. The ETL 20 creates a SCSI command that performs an operation of data extraction, data conversion, data insertion, or the like on the storage device 3. Furthermore, the ETL 20 controls the communication with the storage device 3 via the network 5.

The backup unit 10 outputs an instruction to copy the volume 6 to the storage device 3 in order to create a backup of the volume 6. The backup unit 10 includes a storing unit 10a and a control unit 10b. The storing unit 10a is a functioning unit that stores therein information and includes a copy pair information table 11 as information to be stored. The control unit 10b is a functioning unit that performs a backup process by using the storing unit 10a and includes a copy pair registration unit 12, a copy processing unit 13, and a state checking unit 14.

The copy pair information table 11 is a table that associates, about the copy pair 8, the copy source with the copy destination. FIG. 10 is a schematic diagram illustrating an example of the copy pair information table 11. As illustrated in FIG. 10, in the copy pair information table 11, the copy source information and the copy destination information are included.

In the copy source information, the Box ID and the LUN of the volume 6 at the copy source are included. The Box ID is an identifier for identifying the storage devices 3. The LUN is the virtual LUN. In the copy destination information, the Box ID and the LUN of the volume 6 at the copy destination are included. For example, in the storage device 3 identified by A, the LUN (0x3) and the LUN (0x5) are the copy pair 8 of the LUN (0x3), which is the copy source, and the LUN (0x5), which is the copy destination.

The copy pair registration unit 12 registers, on the basis of a request received from the storage administrator to register the copy pair 8, the information on the copy pair 8 in the copy pair information table 11. For the LUN about the copy pair 8 of the storage device 3 that is not the master, the copy pair registration unit 12 registers the virtual LUN in the copy pair information table 11.

The copy processing unit 13 instructs the storage device 3 to perform a copy. The copy processing unit 13 instructs to perform a copy by specifying the virtual LUNs as the copy source and the copy destination.

The state checking unit 14 acquires, on the basis of a request received from a storage administrator to check a copy state, the information about the status of the copy process from the storage device 3 and sends the acquired information to the operation terminal 4.

The operation terminal 4 is a device that is used by the storage administrator to manage the storage devices 3. The operation terminal 4 receives a registration request of the copy pair 8, a copy request, a check request of the copy state, or the like from the storage administrator and sends the received request to the backup unit 10. Furthermore, the operation terminal 4 displays the state check information sent from the state checking unit 14 on the display device.

The storage device 3 is a device that stores therein information that is used by the server 2. The storage device 3 includes a controller module (CM) 3b and a nonvolatile storing unit 3c. The CM 3b is a device that controls the storage devices 3 and includes a storing unit 30a and a control unit 30b. The storing unit 30a is a functioning unit that stores therein the information that is used by the control unit 30b. The storing unit 30a stores therein a LUN conversion table 31. The LUN conversion table 31 is a table that associates the virtual LUNs with the real LUNs.

FIG. 11 is a schematic diagram illustrating an example of the LUN conversion table 31. As illustrated in FIG. 11, in the LUN conversion table 31, two sets of the Box IDs and the LUNs are included. The first set is the Box ID and the LUN of the master and the second set is the Box ID and the LUN of the own device. In FIG. 11, A is the master and B is the storage device 3 other than the master. For example, the virtual LUN of 0x3 is associated with the real LUN of 0x4 in B.

The control unit 30b controls the storage device 3 by using the information stored in the storing unit 30a. The control unit 30b includes a copy processing unit 32 and an information management unit 33. The copy processing unit 32 performs a copy process on the basis of the copy instruction received from the server 2. The copy processing unit 32 includes a determining unit 32a, a converting unit 32b, and a copying unit 32c.

The determining unit 32a determines whether the own device constitutes a storage cluster and is the storage device 3 other than the master. If a copy request is received from a port for the storage cluster, if the primary and the secondary specified at the time of copy request match, and if the own device is not the primary, the determining unit 32a determines that the own device constitutes the storage cluster and is the storage device 3 other than the master.

The port for the storage cluster mentioned here is the port for the storage device 3 that receives, from the server 2, an instruction about the volumes 6 constituting the storage cluster. Furthermore, the primary mentioned here is the storage device 3 that is normally operated as an active device and is, in this case, the volumes 6 in the master storage device 3. Furthermore, the secondary mentioned here is the storage device 3 that is normally operated as a standby device and is, in this case, the volumes 6 in the storage device 3 that is not the master.

The converting unit 32b converts a virtual LUN to a real LUN by using the LUN conversion table 31 if the determining unit 32a determines that the own device constitutes the storage cluster and is the storage device 3 other than the master.

The copying unit 32c performs a copy of the volumes 6 by using the LUNs. If the determining unit 32a determines that the own device constitutes the storage cluster and is the storage device 3 other than the master, the copying unit 32c performs a copy by using the real LUNs that have been converted by the converting unit 32b.

The information management unit 33 manages the information that is used to control the storage device 3 and sends, to the server 2, the information requested on the basis of the request from the server 2. The information management unit 33 manages information about, for example, the Box IDs, the LUNs, or the like of the volumes 6 and sends, if a request is sent from the server 2, the information about the Box IDs, the LUNs, or the like of the volumes 6 to the server 2.

Furthermore, if the information management unit 33 receives a request from the server 2, the information management unit 33 sends the information about the status of the copy process to the server 2. If a failover occurs, the information management unit 33 acquires the information about the status of the copy process by using the real LUNs that have been converted by the converting unit 32b.

The nonvolatile storing unit 3c is a device in which the writing and the reading of data that is used by the server 2 is performed under the control of the control unit 30b and is a device, such as a hard disk drive (HDD), a solid state drive (SSD), or the like.

In the following, the flow of the process performed by the information processing system 1 according to the embodiment will be described. FIGS. 12A to 12E are a first to a fifth flowcharts each illustrating the flow of the process performed by the information processing system 1 according to the embodiment.

Figure 12A:
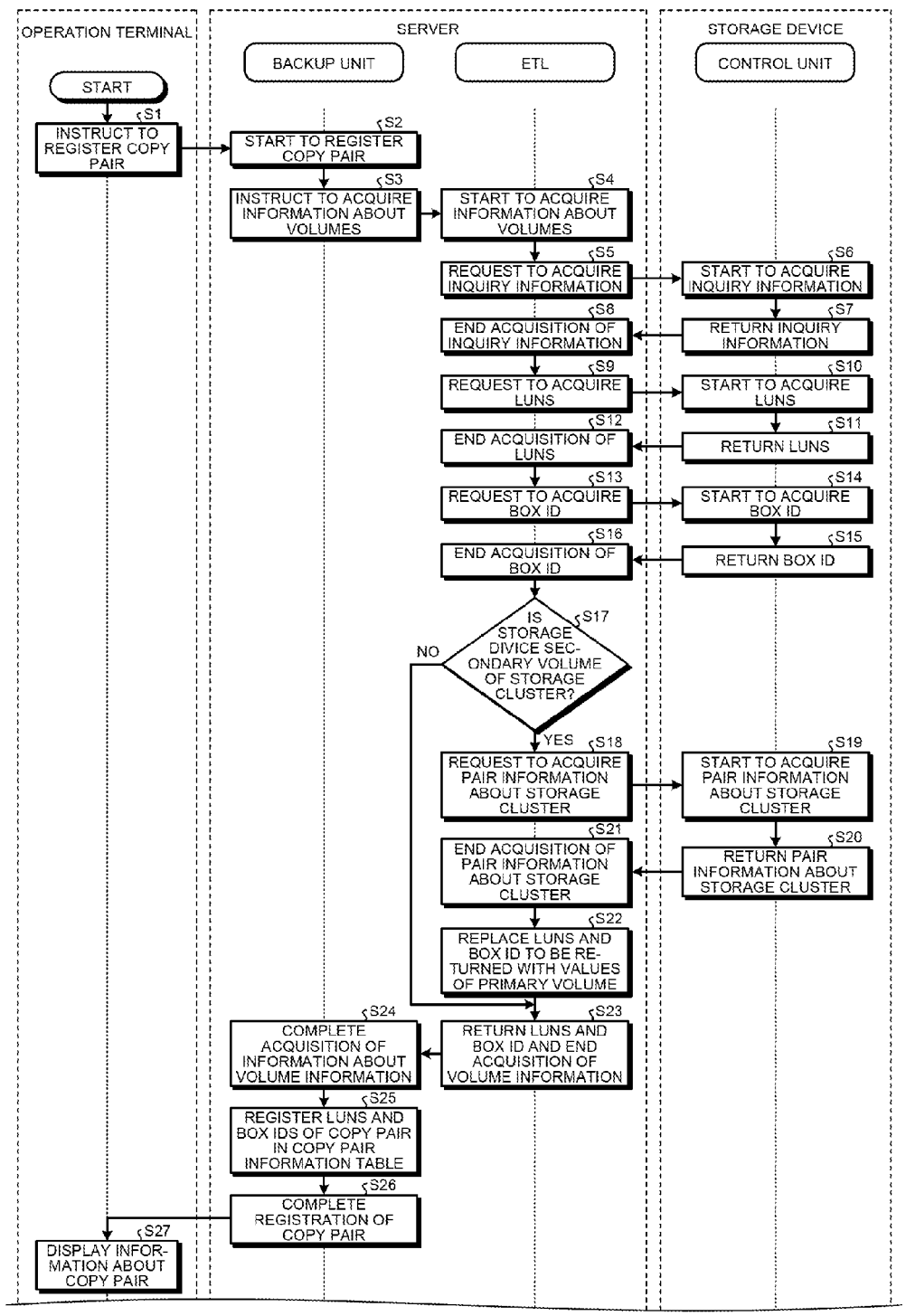
FIG. 12A is a first flowchart illustrating the flow of a process performed by the information processing system according to the embodiment.

As illustrated in FIG. 12A, the operation terminal 4 receives a registration request for the copy pair 8 from the storage administrator and instructs the server 2 to register the copy pair 8 (Step S1). Here, the storage administrator specifies a copy source and a copy destination by specifying the device names. Then, the backup unit 10 receives an instruction to register the copy pair 8 and starts to register the copy pair 8 (Step S2). Then, the backup unit 10 instructs the ETL 20 to acquire the information about the volumes 6 that are to be the copy pair 8 (Step S3).

Then, the ETL 20 starts to acquire the information about the volumes 6 (Step S4), specifies the device names to the active storage device 3, and requests to acquire the INQUIRY information (Step S5). The INQUIRY information mentioned here is information indicating whether the volumes 6 of the specified device names are present. Then, the control unit 30b in the active storage device starts to acquire the INQUIRY information (Step S6) and returns the INQUIRY information (Step S7).

Then, the ETL 20 ends the acquisition of the INQUIRY information (Step S8). If the volumes with the device names are present in the acquired INQUIRY information, the ETL 20 specifies the device names to the active storage device 3 and requests to acquire the LUNs (Step S9). Then, the control unit 30b in the active storage device starts to acquire the LUNs (Step S10) and returns the LUNs (Step S11).

Then, the ETL 20 ends the acquisition of the LUNs (Step S12), specifies the device names to the active storage device 3, and requests to acquire the Box ID (Step S13). Then, the control unit 30b in the active storage device 3 starts to acquire the Box ID (Step S14) and returns the Box ID (Step S15).

Then, the ETL 20 ends the acquisition of the Box ID (Step S16). The processes at Steps S5 to S16 are performed for the device name of the copy source and the device name of the copy destination.

Then, the ETL 20 determines whether the storage device 3 that has acquired the LUNs and the Box ID is the secondary volume in the storage cluster (Step S17). If the storage device 3 is not the secondary volume in the storage cluster, the ETL 20 proceeds to Step S23. The secondary volume mentioned here is the volume in the secondary storage device 3. Furthermore, the primary volume is the volume in the primary storage device 3.

In contrast, if the storage device 3 is the secondary volume in the storage cluster, the ETL 20 specifies the Box ID and the LUNs to the storage device 3 and requests to acquire the pair information about the storage cluster (Step S18). The pair information about the storage cluster mentioned here is the Box ID and the LUNs of the volumes 6 that constitute the cluster pair 7 with the volumes 6 of the specified Box ID and the LUNs. In this case, because the Box ID and the LUNs of the secondary volume are specified, the pair information about the storage cluster is the Box ID and the LUNs of the primary volume.

Then, the storage device 3 starts to acquire the pair information about the storage cluster by using the LUN conversion table 31 (Step S19) and returns the pair information about the storage cluster (Step S20). Then, the ETL 20 ends the acquisition of the pair information about the storage cluster (Step S21) and replaces the LUNs and the Box ID to be returned with the acquired pair information about the storage cluster, i.e., the values of the primary volume (Step S22). The processes at Steps S18 to S22 are performed about the LUN and the Box ID of the copy source and the LUN and the Box ID of the copy destination.

Then, the ETL 20 returns, to the backup unit 10, the LUNs and the Box ID of the copy source and the copy destination as the volume information and ends the acquisition of the information about the volumes 6 (Step S23). Then, the backup unit 10 receives the LUNs and the Box ID of the copy source and the copy destination and completes the acquisition of the information about the volumes 6 (Step S24). Then, the backup unit 10 registers the LUNs and the Box ID of the copy pair 8 in the copy pair information table 11 (Step S25), sends the LUNs and the Box ID of the copy pair 8 to the operation terminal 4, and completes the registration of the copy pair (Step S26). Then, the operation terminal 4 receives the LUNs and the Box ID of the copy pair 8 as the information about the copy pair 8 and displays the information about the copy pair 8 (Step S27).

Figure 12B:
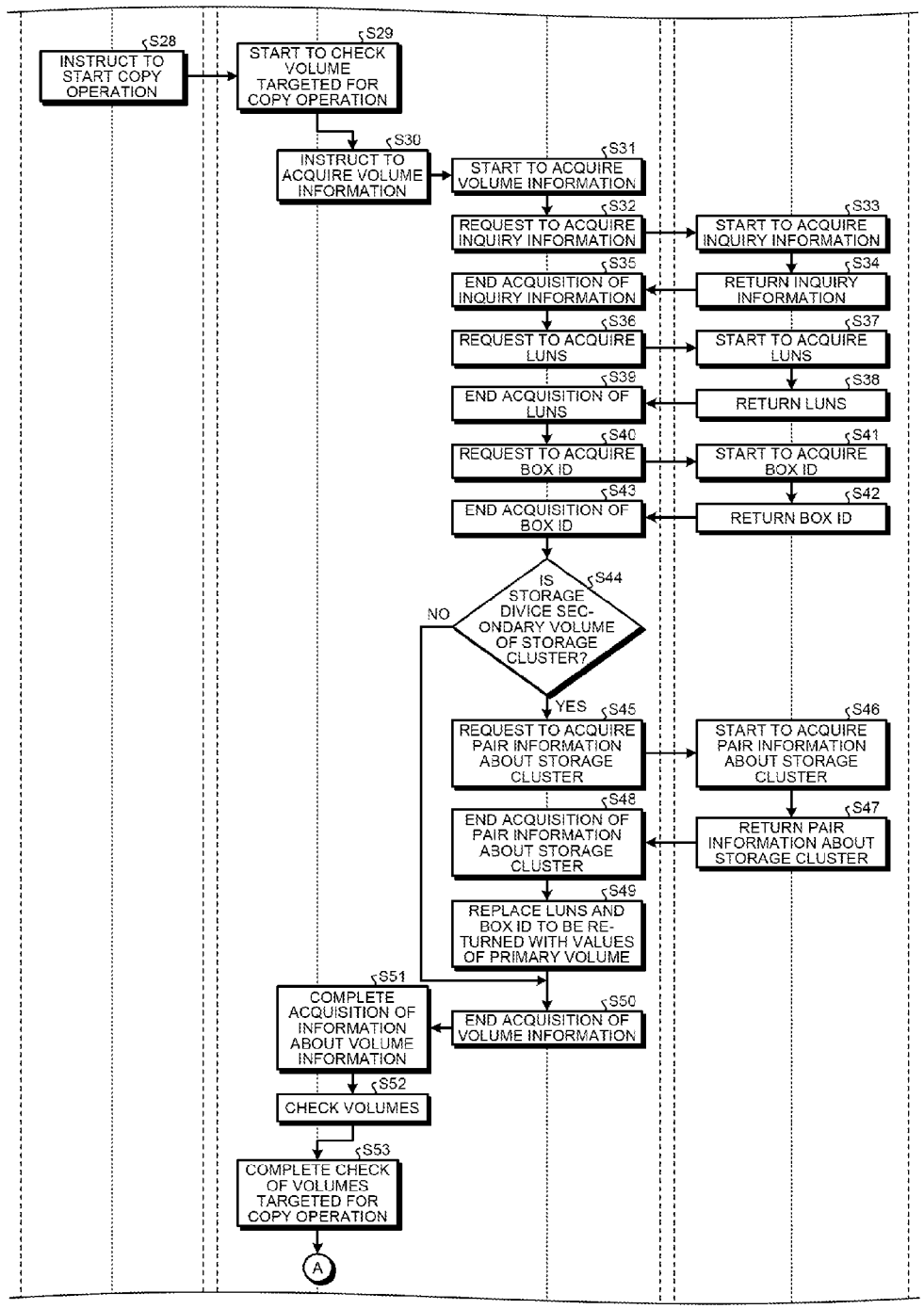
FIG. 12B is a second flowchart illustrating the flow of a process performed by the information processing system according to the embodiment.

Then, as illustrated in FIG. 12B, the operation terminal 4 receives a start request of the copy operation from the storage administrator and instructs the server 2 to start the copy operation (Step S28). Then, the backup unit 10 receives the instruction to start the copy operation and starts to check the volumes 6 targeted for the copy operation (Step S29). Then, the backup unit 10 instructs the ETL 20 to acquire the information about the volumes 6 that become the copy pair 8 (Step S30).

Then, the ETL 20 starts to acquire the information about the volumes 6 (Step S31), specifies the device names to the active storage device 3, and requests to acquire the INQUIRY information (Step S32). Then, the control unit 30b in the active storage device starts to acquire the INQUIRY information (Step S33) and returns the INQUIRY information (Step S34).

Then, the ETL 20 ends the acquisition of the INQUIRY information (Step S35). If the ETL 20 determines that the volumes 6 with the device names are present in the acquired INQUIRY information, the ETL 20 specifies the device names to the active storage device 3 and requests to acquire the LUNs (Step S36). Then, the control unit 30b in the active storage device starts to acquire the LUNs (Step S37) and returns the LUNs (Step S38).

Then, the ETL 20 ends the acquisition of the LUNs (Step S39), specifies the device names to the active storage device 3, and requests to acquire the Box ID (Step S40). Then, the control unit 30b in the active storage device 3 starts to acquire the Box ID (Step S41) and returns the Box ID (Step S42).

Then, the ETL 20 ends the acquisition of the Box ID (Step S43). The processes at Steps S32 to S43 are performed about the device name of the copy source and the device name of the copy destination.

Then, the ETL 20 determines whether the storage device 3 that has acquired the LUNs and the Box ID is the secondary volume in the storage cluster (Step S44). If the storage device 3 is not the secondary volume in the storage cluster, the ETL 20 proceeds to Step S50.

In contrast, if the storage device 3 is the secondary volume in the storage cluster, the ETL 20 specifies the Box ID and the LUNs to the storage device 3 and requests to acquire the pair information about the storage cluster (Step S45).

Then, the storage device 3 starts to acquire the pair information about the storage cluster by using the LUN conversion table 31 (Step S46) and returns the pair information about the storage cluster (Step S47). Then, the ETL 20 ends the acquisition of the pair information about the storage cluster (Step S48) and replaces the LUNs and the Box ID to be returned with the acquired pair information about the storage cluster, i.e., the values of the primary volume (Step S49). The processes at Steps S45 to S49 are performed about the LUN and the Box ID of the copy source and the LUN and the Box ID of the copy destination.

Then, the ETL 20 returns, to the backup unit 10, the LUNs and the Box ID of the copy source and the copy destination as the volume information and ends the acquisition of the information about the volumes 6 (Step S50). Then, the backup unit 10 receives the LUNs and the Box ID of the copy source and the copy destination and completes the acquisition of the information about the volumes 6 (Step S51). Then, the backup unit 10 checks the volumes (Step S52) and completes the check of the volumes 6 targeted for the copy operation (Step S53).

Then, as illustrated in FIG. 12C, the backup unit 10 instructs the ETL 20 to start a copy (Step S54) and the ETL 20 specifies the LUNs of the copy source and the copy destination to the storage device 3 that is identified by the Box ID and requests to start the copy (Step S55). Then, the storage device 3 identified by the Box ID starts the copy process (Step S56).

At this point, if a failure occurs in the active storage device 3 and thus a failover occurs, the copy instruction received from the server 2 is taken over to the storage device 3 that has newly become active. Then, the storage device 3 that has newly become active determines whether a copy request is received from the port that is used for the storage cluster (Step S57). If the request is not the copy request from the port that is used for the storage cluster, the storage device 3 that has newly become active proceeds to Step S62.

In contrast, if the request is the copy request from the port that is used for the storage cluster, the storage device 3 that has newly become active acquires the information indicating whether the own device is the primary device or the secondary device (Step S58). Then, the storage device 3 that has newly become active determines whether the acquired information matches the information indicating the primary device or the secondary device specified at the time of copy request (Step S59). If both the pieces of information do not match, the process proceeds to Step S67. The information indicating the primary or the secondary specified at the time of copy request is the information that was used to perform the determination at Step S44.

Then, if both the pieces of information match, the storage device 3 that has newly become active determines whether the own device is the primary device (Step S60). If the own device is not the primary device, the storage device 3 replaces the Box ID and the LUNs with the values of the secondary device (Step S61). Namely, the storage device 3 that has newly become active converts the virtual LUNs to the real LUNs, if the own device is not the primary device.

Then, the storage device 3 that has newly become active performs a copy (Step S62) and determines whether the start of the copy has been successful (Step S63). If the start of the copy has been successful, the storage device 3 that has newly become active sends a response to the server 2 indicating normal (Step S64) and the ETL 20 sends a response to the backup unit 10 indicating normal (Step S65). Then, the backup unit 10 completes the copy (Step S66).

In contrast, if the start of the copy has failed, the storage device 3 that has newly become active sends a response to the server 2 indicating an error (Step S67) and the ETL 20 sends a response to the backup unit 10 indicating the error (Step S68). Then, the backup unit 10 fails in the copy (Step S69).

If the backup unit 10 completes the copy or fails in the copy, the backup unit 10 completes the copy operation (Step S70) and notifies the operation terminal 4 of the completion of the copy operation. Then, the operation terminal 4 displays the completion of the copy operation on the display device (Step S71).

Figure 12D:
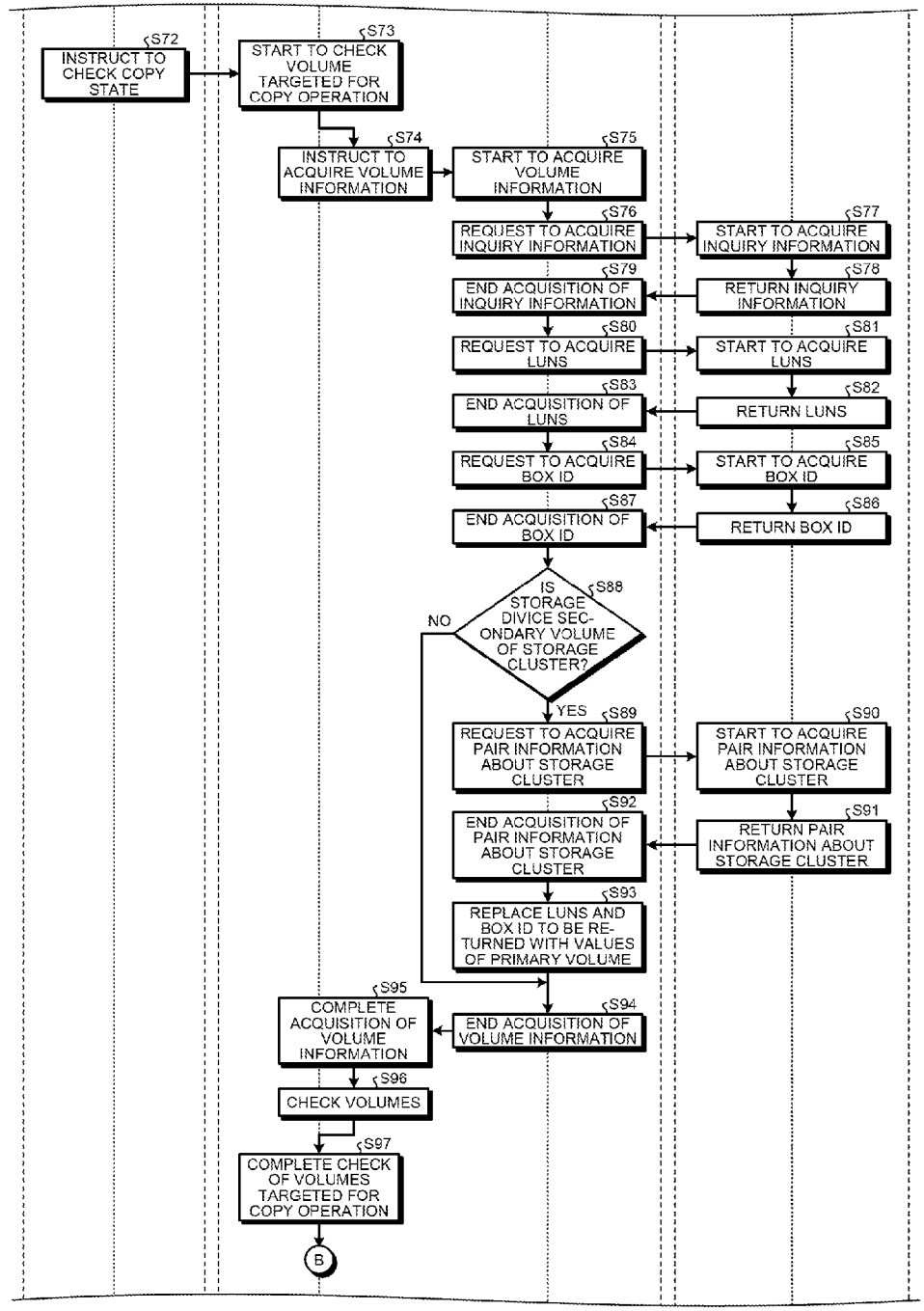
FIG. 12D is a fourth flowchart illustrating the flow of a process performed by the information processing system according to the embodiment.

Then, as illustrated in FIG. 12D, the operation terminal 4 receives a check request for the copy state from the storage administrator and instructs the server 2 to check the copy state (Step S72). Then, the backup unit 10 receives the instruction to check the copy state and starts to check the volumes 6 targeted for the copy operation (Step S73). Then, the backup unit 10 instructs the ETL 20 to acquire the information about the volumes 6 that become the copy pair 8 (Step S74).

Then, the ETL 20 starts to acquire the information about the volumes 6 (Step S75), specifies the device names to the active storage device 3, and requests to acquire the INQUIRY information (Step S76). Then, the control unit 30b in the active storage device starts to acquire the INQUIRY information (Step S77) and returns the INQUIRY information (Step S78).

Then, the ETL 20 ends the acquisition of the INQUIRY information (Step S79). If the ETL 20 determines that the volumes 6 with the device names are present in the acquired INQUIRY information, the ETL 20 specifies the device names to the active storage device 3 and requests to acquire the LUNs (Step S80). Then, the control unit 30b in the active storage device starts to acquire the LUNs (Step S81) and returns the LUNs (Step S82).

Then, the ETL 20 ends the acquisition of the LUNs (Step S83), specifies the device names to the active storage device 3, and requests to acquire the Box ID (Step S84). Then, the control unit 30b in the active storage device 3 starts to acquire the Box ID (Step S85) and returns the Box ID (Step S86).

Then, the ETL 20 ends the acquisition of the Box ID (Step S87). The processes at Steps S76 to S87 are performed about the device name of the copy source and the device name of the copy destination.

Then, the ETL 20 determines whether the storage device 3 that has acquired the LUNs and the Box ID is the secondary volume in the storage cluster (Step S88). If the storage device 3 is not the secondary volume in the storage cluster, the ETL 20 proceeds to Step S94.

In contrast, if the storage device 3 is the secondary volume in the storage cluster, the ETL 20 specifies the Box ID and the LUNs to the storage device 3 and requests to acquire the pair information about the storage cluster (Step S89).

Then, the storage device 3 starts to acquire the pair information about the storage cluster by using the LUN conversion table 31 (Step S90) and returns the pair information about the storage cluster (Step S91). Then, the ETL 20 ends the acquisition of the pair information about the storage cluster (Step S92) and replaces the LUNs and the Box ID to be returned with the acquired pair information about the storage cluster, i.e., the values of the primary volume (Step S93). The processes at Steps S89 to S93 are performed about the LUN and the Box ID of the copy source and the LUN and the Box ID of the copy destination.

Then, the ETL 20 returns, to the backup unit 10, the LUNs and the Box ID of the copy source and the copy destination as the volume information and ends the acquisition of the information about the volumes 6 (Step S94). Then, the backup unit 10 receives the LUNs and the Box ID of the copy source and the copy destination and completes the acquisition of the information about the volumes 6 (Step S95). Then, the backup unit 10 checks the volumes (Step S96) and completes the check of the volumes 6 targeted for the copy operation (Step S97).

Figure 12E:
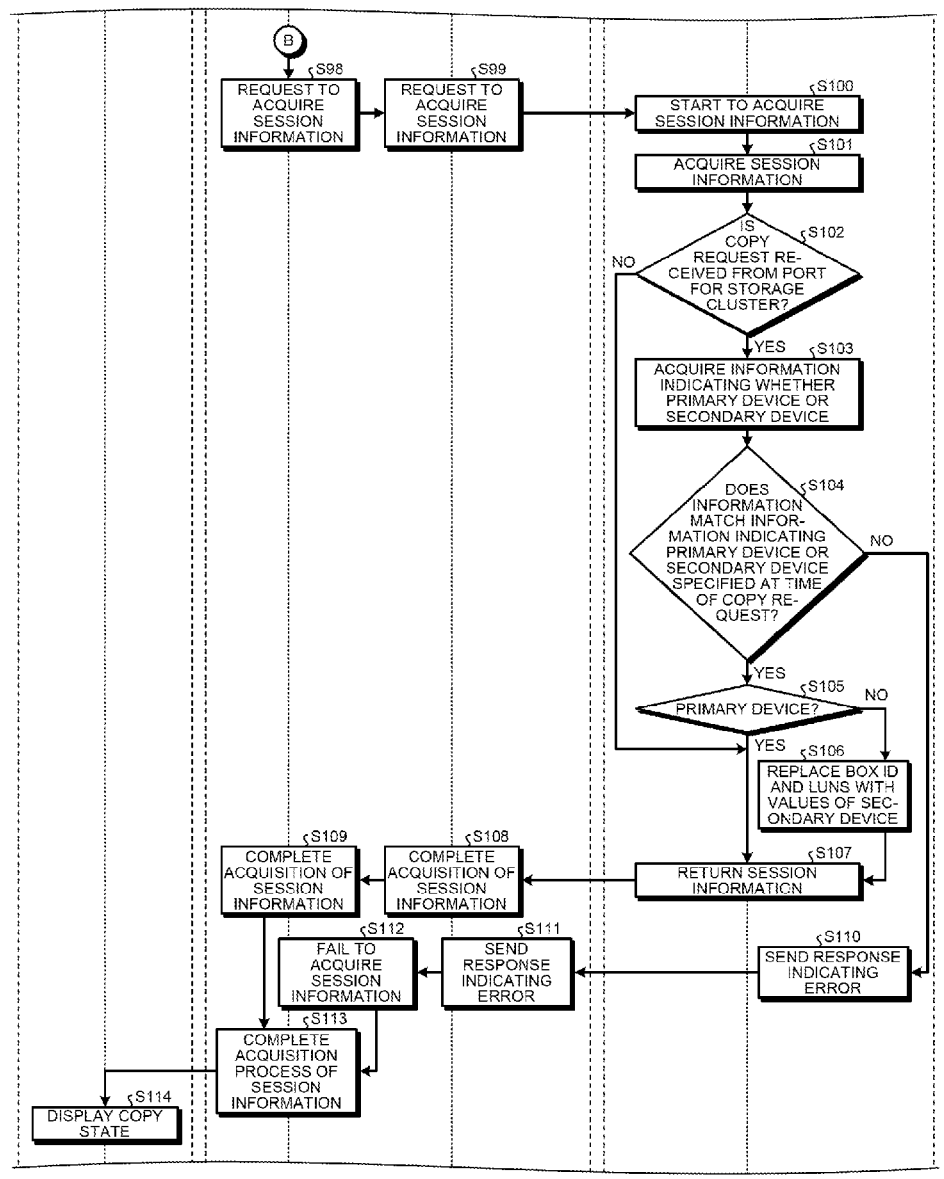
FIG. 12E is a fifth flowchart illustrating the flow of a process performed by the information processing system according to the embodiment.

Then, as illustrated in FIG. 12E, the backup unit 10 requests the ETL 20 to acquire session information (Step S98) and the ETL 20 specifies the LUNs of the copy source and the copy destination to the storage device 3 that is identified by the Box ID and requests to acquire the session information (Step S99). Then, if a failover occurs, the storage device 3 that has newly become active starts to acquire the session information (Step S100).

Then, the storage device 3 that has newly become active acquires the session information (Step S101) and determines whether the copy request is received from the port for the storage cluster (Step S102). If the copy request is not received from the port for the storage cluster, the storage device 3 that has newly become active proceeds to Step S107.

In contrast, if the copy request is received from the port for the storage cluster, the storage device 3 that has newly become active acquires information indicating whether the own device is the primary device or the secondary device (Step S103). Then, the storage device 3 that has newly become active determines whether the acquired information matches the information indicating the primary device or the secondary device that was specified at the time of copy request (Step S104). If both the pieces of information do not match, the storage device 3 proceeds to Step S110.

In contrast, if both the pieces of information match, the storage device 3 that has newly become active determines whether the own device is the primary device (Step S105). If the storage device 3 is not the primary device, the storage device 3 replaces the Box ID and the LUNs with the values of the secondary device (Step S106).

Then, the storage device 3 that has newly become active returns the session information to the ETL 20 (Step S107) and the ETL 20 sends the session information to the backup unit 10 and completes the acquisition of the session information (Step S108). Then, the backup unit 10 completes the acquisition of the session information (Step S109) and proceeds to Step S113.

Furthermore, if both the pieces of information do not match at Step S104, the storage device 3 sends a response to the ETL 20 indicating an error (Step S110), the ETL 20 sends a response to the backup unit 10 indicating the error (Step S111), and the backup unit 10 fails to acquire the session information (Step S112).

Then, the backup unit 10 completes the process of acquiring the session information (Step S113) and sends the session information or a failure of the process to the operation terminal 4. Then, when the operation terminal 4 acquires the session information, the operation terminal 4 displays the copy state on the display device (Step S114).

As described above, if a failover occurs when a start of a copy is being requested, the storage device 3 that has newly become active determines whether the own device is the primary device. If the storage device 3 is not the primary device, the storage device 3 converts the virtual LUNs to the real LUNs and performs a copy. Accordingly, the storage device 3 can perform the copy by using the correct LUNs after the failover.

Furthermore, in the embodiment, a description has been given of the storage management unit 2a; however, by implementing the configuration included in the storage management unit 2a by software, it is possible to obtain a storage management program having the same function as is performed by the storage management unit 2a. Accordingly, the hardware configuration of the server 2 that executes the storage management program will be described.

Figure 13:
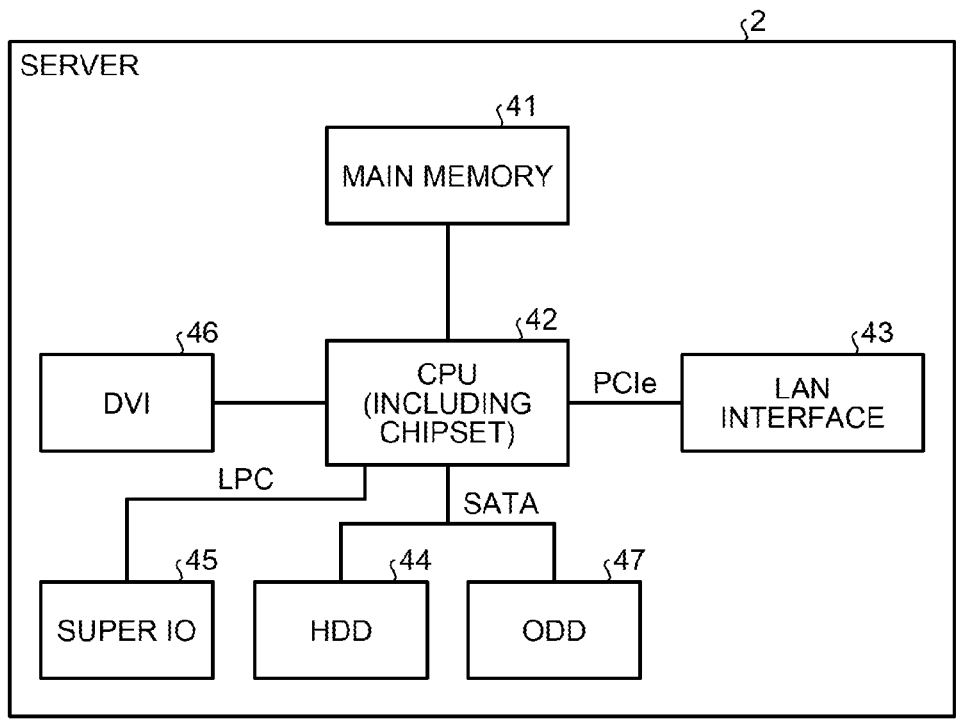
FIG. 13 is a block diagram illustrating the hardware configuration of a server.

FIG. 13 is a block diagram illustrating the hardware configuration of the server 2. As illustrated in FIG. 13, the server 2 includes a main memory 41, a central processing unit (CPU) 42, a local area network (LAN) interface 43, and a hard disk drive (HDD) 44. Furthermore, the server 2 includes a super input/output (IO) 45, a digital visual interface (DVI) 46, and an optical disk drive (ODD) 47.

The main memory 41 is a memory that stores therein programs, intermediate results of the programs, or the like. The CPU 42 is a central processing unit that reads a program from the main memory 41 and executes the program. The CPU 42 includes a chipset that has a memory controller.

The LAN interface 43 is an interface for connecting the server 2 to another computer via a LAN. The HDD 44 is a disk device that stores therein programs or data and the super IO 45 is an interface for connecting an input device, such as a mouse, a keyboard, or the like. The DVI 46 is an interface for connecting a liquid crystal display device and the ODD 47 is a device that reads and writes a DVD.

The LAN interface 43 is connected to the CPU 42 by a PCI Express (PCIe). The HDD 44 and the ODD 47 are connected to the CPU 42 by a serial advanced technology attachment (SATA). The super IO 45 is connected to the CPU 42 by the low pin count (LPC).

Then, the storage management program executed by the server 2 is stored in the DVD, is read from the DVD by the ODD 47, and is installed in the server 2. Alternatively, the storage management program is stored in a database or the like in another computer system that is connected via the LAN interface 43, is read from the database, and is installed in the server 2. Then, the installed storage management program is stored in the HDD 44, is read to the main memory 41, and is executed by the CPU 42.

Figure 14:
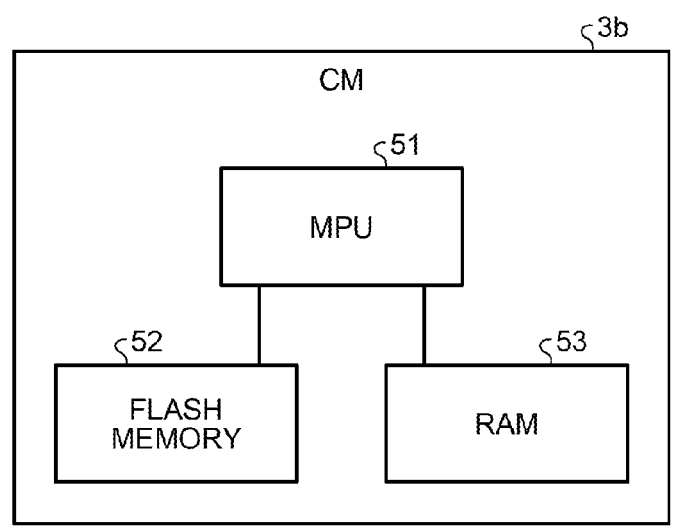
FIG. 14 is a block diagram illustrating the hardware configuration of a CM.

Furthermore, in the embodiment, a description has been given of the CM 3b; however, the function performed by the CM 3b is implemented by firmware. Accordingly, the hardware configuration of the CM 3b will be described. FIG. 14 is a block diagram illustrating the hardware configuration of the CM 3b. As illustrated in FIG. 14, the CM 3b includes a micro processing unit (MPU) 51, a flash memory 52, and a random access memory (RAM) 53.

The MPU 51 is a processing unit that reads the firmware stored in the RAM 53 and that executes the read firmware. The flash memory 52 is a nonvolatile memory that stores therein the LUN conversion table 31 and the firmware as a storage control program. The RAM 53 is a volatile memory that stores therein the LUN conversion table 31 and the firmware read from the flash memory 52. Furthermore, the RAM 53 stores therein data needed to execute the firmware, intermediate results of the firmware, or the like.

As described above, in the embodiment, the determining unit 32*a* determines whether, when a failover occurs, the own device is the master device and, if the determining unit 32*a* determines that the own device is not the master device, the converting unit 32*b* converts the virtual LUNs of the copy source and the copy destination to the real LUNs. Then, the copying unit 32*c* performs the copy process by using the real LUNs converted by the converting unit 32*b*. Accordingly, regarding a copy instruction that is being processed when a failover occurs, the storage cluster can perform the copy by using the correct LUNs in the storage device 3 that has newly become active.

Furthermore, in the embodiment, the storing unit 30*a* in the storage device 3 stores therein the LUN conversion table 31 in which the virtual LUNs are associated with the real LUNs and the converting unit 32*b* converts the real LUNs to the virtual LUNs by using the LUN conversion table 31. Accordingly, the converting unit 32*b* can easily convert the real LUNs to the virtual LUNs when a failover occurs.

Furthermore, in the embodiment, when a failover occurs, the information management unit 33 acquires information about the status of the copy process by using the real LUNs that were converted by the converting unit 32*b*. Accordingly, regarding a copy instruction that is being processed when a failover occurs, the storage cluster can provide a storage administrator with the status of the copy process by using the correct LUNs in the storage device 3 that has newly become active.

In the embodiment, a description has been given of a case in which the server 2 includes the backup unit 10; however, the present invention is not limited thereto but may also be applied to a case in which the storage device 3 includes the backup unit. Furthermore, the backup unit 10 may also be a device separate from both the server 2 and the storage device 3.

Furthermore, in the embodiment, a description has been given of the backup unit 10; however, the present invention is not limited thereto but may also be applied to a copy management unit that manages a copy of the volumes 6.

According to an aspect of the embodiment, an advantage is provided in that a correct volume can be operated when a failover occurs.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device that controls storage devices constituting a storage cluster and connecting each other via a network, the storage control device comprising a memory and a processor coupled to the memory, the processor executing a process including:
   determining, when a failover occurs during a copy process from a copy source volume to a copy destination volume, both of the copy source volume and the copy destination volume that constitutes a copy pair being arranged in one of the storage devices constituting the storage cluster, whether a storage device controlled by the storage control device is a master device that performs the copy process by using two identifiers specified about the copy pair by a copy instruction;
   converting, when it is determined that the storage device is not the master device at the determining, the two identifiers that specify a copy pair and are specified by the copy instruction to two identifiers that specify a copy pair in the storage device controlled by the storage control device; and
   performing the copy process by using the two identifiers converted at the converting.

2. The storage control device according to claim 1, wherein the converting includes converting the two identifiers specified by the copy instruction using a storing unit that stores therein, in an associated manner, the two identifiers specified by the copy instruction and the two identifiers that specify the copy pair in the storage device.

3. The storage control device according to claim 1, the process further including acquiring, by using the two identifiers converted at the converting, information indicating status of the copy process.

4. The storage control device according to claim 1, wherein when it is determined that the storage device is not the master device at the determining, the performing performs the copy process from a first volume to a second volume after the converting, the first volume being a cluster pair of the copy source volume in the storage device and the second volume being a cluster pair of the copy destination volume in the storage device.

5. A computer-readable recording medium having stored therein a storage control program that causes a computer, which is included in a storage control device that controls a storage device among storage devices constituting a storage cluster and connecting each other via a network, to execute a process comprising:
   determining, when a failover occurs during a copy process from a copy source volume to a copy destination volume, both of the copy source volume and the copy destination volume that constitutes a copy pair being arranged in one of the storage devices constituting the storage cluster, whether the storage device controlled by the storage control device is a master device that performs the copy process by using two identifiers specified about the copy pair by a copy instruction;
   converting, when it is determined that the storage device is not the master device, the two identifiers that specify a copy pair and are specified by the copy instruction to two identifiers that specify a copy pair in the storage device controlled by the storage control device; and
   performing the copy process by using the converted two identifiers.

6. The computer-readable recording medium according to claim 5, wherein the converting includes converting the two identifiers specified by the copy instruction using a storing unit that stores therein, in an associated manner, the two identifiers specified by the copy instruction and the two identifiers that specify the copy pair in the storage device.

7. The computer-readable recording medium according to claim 5, the process further including acquiring, by using the two identifiers converted at the converting, information indicating status of the copy process.

8. The storage control device according to claim 1, wherein the converting includes converting two LUNs that specify the copy pair from a LUN of a copy source volume and a LUN of a copy destination volume specified by the copy instruction to a LUN of a volume constituting a cluster pair with the copy source volume and a LUN of a volume constituting a cluster pair with the copy destination volume.

* * * * *